United States Patent
Chujo et al.

[11] Patent Number: 5,441,561
[45] Date of Patent: Aug. 15, 1995

[54] INK-JET RECORDING INK AND INK-JET RECORDING METHODS THEREOF

[75] Inventors: Akihiko Chujo; Toshitake Yui; Ken Hashimoto; Yoshiro Yamashita; Fuminori Koide; Yasuharu Endo; Etsuo Sagara, all of Minami-ashigari, Japan

[73] Assignee: Fuji Xerox Co., Ltd., Tokyo, Japan

[21] Appl. No.: 264,913

[22] Filed: Jun. 24, 1994

Related U.S. Application Data

[63] Continuation-in-part of Ser. No. 200,019, Feb. 22, 1994, abandoned.

[30] Foreign Application Priority Data

Feb. 23, 1993 [JP] Japan .................. 5-33548
Jun. 25, 1993 [JP] Japan .................. 5-177629

[51] Int. Cl.$^6$ .................................. G09D 11/02
[52] U.S. Cl. .......................... 106/20 C; 106/22 C; 106/22 B
[58] Field of Search ............ 106/22 C, 22 B, 20 C, 106/23 C, 23 B

[56] References Cited

U.S. PATENT DOCUMENTS

| | | | |
|---|---|---|---|
| 4,383,859 | 5/1983 | Moore et al. | 106/22 B |
| 4,664,815 | 5/1987 | Ozawa et al. | 106/22 B |
| 4,732,613 | 3/1988 | Shioya et al. | 106/22 B |
| 4,778,525 | 10/1988 | Kobayashi et al. | 106/22 B |
| 4,867,789 | 9/1989 | Eida et al. | 106/22 B |

FOREIGN PATENT DOCUMENTS

| | | |
|---|---|---|
| 61-250077 | 11/1986 | Japan . |
| 63-139963 | 6/1988 | Japan . |
| 2-151674 | 6/1990 | Japan . |
| 3-48950 | 7/1991 | Japan . |
| 3-48951 | 7/1991 | Japan . |
| 3-48952 | 7/1991 | Japan . |
| 3-48953 | 7/1991 | Japan . |
| 3-48954 | 7/1991 | Japan . |
| 4-239067 | 8/1992 | Japan . |

*Primary Examiner*—Helene Klemanski
*Attorney, Agent, or Firm*—Oliff & Berridge

[57] ABSTRACT

Ink-jet recording ink comprising water, a water-soluble organic solvent and a color material as essential ingredients, wherein the total volume of particulate matter ranges from $1 \times 10^{-9}$ to $1 \times 10^{-2}$ cm$^3$ per cm$^3$ of ink, whereby defects in images such as blank areas on images, fluctuations in dot diameter and the disturbed shape of dots are not generated to give a prominent effect and wherein the total volume of the particulate matter existing in 1 cm$^3$ of the ink is adjusted to $3.5 \times 10^{-6}$ or less, whereby ink which is stable even after long-term use can be obtained and change in amount of ink at jetting is slight, as well as defects in images can be prevented.

12 Claims, 3 Drawing Sheets

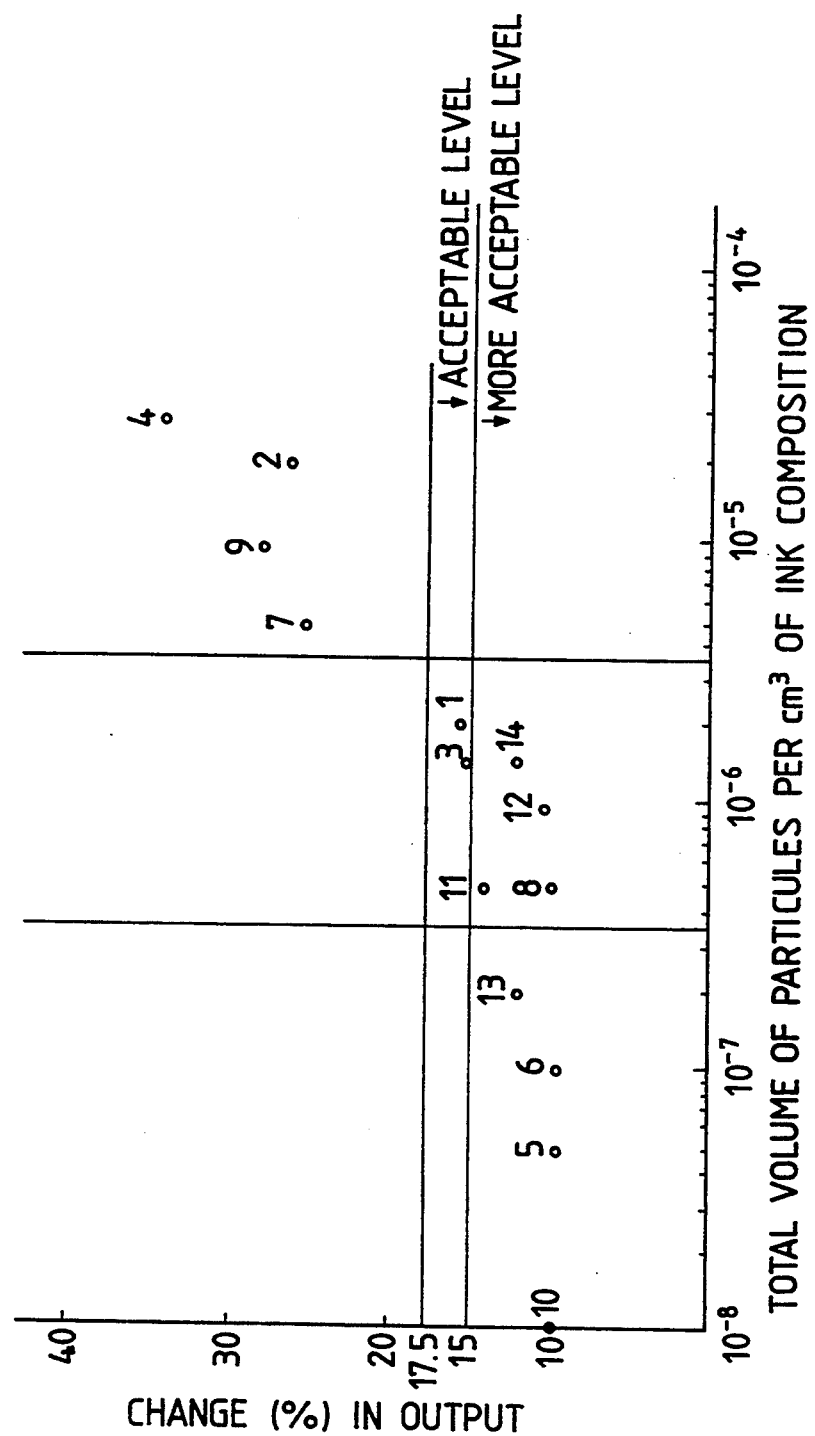

INK-JET RECORDING INK AND INK-JET RECORDING METHODS THEREOF

This is a Continuation-in-Part of application No. 08/200,019, filed Feb. 22, 1994 now abandoned.

FIELD OF THE INVENTION

The present invention relates to recording liquid (hereinafter referred to as "ink") for making recording on materials to be recorded with ink-jet recording devices and ink-jet recording method using the same.

BACKGROUND OF THE INVENTION

The principle of recording devices of an ink-jet recording type consists in that liquid or melted solid ink is jetted through nozzles, slits, porous films or the like to make recording on paper, cloth or film sheets. As methods for jetting ink, various types of systems have been proposed such as the so-called charge control system in which ink is extruded by making use of electrostatic attraction, the so-called drop-on-demand system (pressure pulse system) in which ink is jetted by making use of vibrational pressure of a piezo element, and the so-called thermal ink-jet system in which ink is jetted by making use of pressure resulting from foams formed and developed by heightened heat. These systems make it possible to obtain extremely highly precise images.

As the ink used for such ink-jet recording systems solutions or dispersions are known and employed in which various water-soluble dyes or pigments are dissolved in water or liquid media comprising water-soluble organic solvents.

Of various requirements for an ink composition for ink jet recording, the most demanded one is liquid stability during use. That is, when recording is suspended or when recording is not effected for a long time, an ink composition should not cause clogging of nozzles or orifices of a recording apparatus or not to produce sediment. In a thermal ink jet system, in particular, foreign matter is apt to be deposited on the surface of a heater, which is for forming and growing bubbles in an ink, with changes in temperature. The foreign matter deposit on the head of the heater is called kogation. In long-term recording operation, kogation is released to cause a change in ink output, leading to variation of image quality. Conventional ink compositions contain several additives necessary for satisfying various conditions, such as ink jet conditions, stability against long-term storage, image clearness and density, surface tension, electrical properties, and the like as well as various impurities originated in the dye or pigment. Therefore, the ink compositions tend to cause clogging of nozzles or orifices, kogation on the head of a heater, and, when left out of use for a long period of time, produce sediment at nozzles or orifices.

In order to solve these problems, various proposals have been made. For example, JP-B-3-48950 (the term "JP-B" as used herein means an "examined published Japanese patent application") discloses adjustment of the iron content of an ink composition to 4 ppm or less. JP-B-3-48951 teaches adjusting the total content of iron and silicon in an ink composition to 9 ppm or less. JP-B-3-48952 proposes adjusting the magnesium content of an ink composition to 4 ppm or less. JP-B-3-48953 suggests adjusting the total content of calcium, magnesium, manganese, iron, aluminum, and silicon in an ink composition to 20 ppm or less. Further, JP-B-3-48954 proposes adjusting the content of lyophobic colloid in an ink composition to 13 ppm or less. However, none of these ink compositions proposed succeeded in perfectly solving the above-mentioned problems.

In particular, staying of foams formed inside ink passages in ink-jet recording devices results in prevention of the uniform streams of ink, and causes defects in images such as blank areas on images, fluctuations in dot diameter, and the disturbed shape of dots. Hence, a great number of methods for controlling the formation of foams in ink have hitherto been proposed.

For example, in recording liquids containing surfactants, JP-A-61-250077 (the term "JP-A" as used herein means an "unexamined published Japanese patent application") discloses to restrict the foaming property of the surfactants according to the Ross-Miles method to 150 mm or less in foam height of 0.1% by weight aqueous solutions after 5 minutes. JP-A-63-139963 proposes to adjust foam stability after 5 minutes to 0 mm. Further, JP-A-2-151674 offers the use of ink of 10 to 200 mm in formability and 10 to 200 mm in foam stability, and JP-A-4-239067 proposes to restrict the HLB value of surfactants to 10 to 20 to prevent defects in images due to foaming.

However, the control of foaming properties in conventional methods are effective only when ink passages in devices have smooth surfaces formed of glass or silicones. Passages in actual devices are not sufficiently satisfactory because they have complex shapes and are formed of two or more kinds of materials such as plastics and rubber materials. That is, the Ross-Miles method denoted in JP-A-61-250077, JP-A-63-139963 and JP-A-2-151674 determines the behavior of foams on smooth glass surfaces, and is therefore effective for controlling foaming on smooth glass surfaces and silicone surfaces having similar surface properties to those of glass. However, this method is not satisfactory to surfaces of complex shapes constituting the inside of the passages or to portions composed of plastics or rubber materials. Further, the method proposed in JP-A-4-239067 is also not sufficiently satisfactory.

SUMMARY OF THE INVENTION

An object of the present invention is therefore to provide ink which can stably give highly precise images in ink-jet recording devices.

As a result of intensive studies on various properties of ink, the present inventors have discovered that highly precise images can be stably obtained without generation of defects in images such as blank areas, fluctuations in dot diameter, or the disturbed shape of dots by adjusting the total volume of particulate matter per unit volume of ink to a certain range.

Further, the present inventors have found that the particulate matters are liable to be deposited especially on the surface of a heater, not easily removed therefrom and, in continuous and long-lasting ink jetting, accumulated on the surface of a heater. They have therefore found that reduction of the particles in amount leads to reduction of deposit on the surface of the heater, thereby making it possible to minimize reduction in ink output during long-term recording. They have further found that, with the amount of the particulate matter being reduced to a certain range, ink droplets jetted by application of heat energy to the ink maintain a constant size even when jetted continuously for an extended period of time. The present invention has thus been completed based on the findings.

The present invention provides ink-jet recording ink comprising water, a water-soluble organic solvent and a color material as essential ingredients, in which the total volume of particulate matter existing in 1 cm$^3$ of the ink ranges from $1 \times 10^{-9}$ to $1 \times 10^{-2}$ cm$^3$.

Further, the present invention provides ink-jet recording ink comprising water, a water-soluble organic solvent and a color material as essential ingredients, in which the total volume of particulate matter existing in 1 cm$^3$ of the ink ranges from $3.5 \times 10^{-6}$ cm$^3$ or less.

The ink of the present invention exhibits a significant effect, particularly when it passes through ink passages formed of two or more kinds of materials, for example, a material including plastics and metals.

In this specification, the "ink passage" means a path from an ink storage portion to a jetting portion also including nozzle portion.

BRIEF DESCRIPTION OF THE DRAWING

FIG. 3 shows the relationship between change in ink output (%) at the $2 \times 10^8$th jet and total volume (cm$^3$) of particles per cm$^3$ of an ink composition.

DETAILED DESCRIPTION OF THE INVENTION

Figure 1:
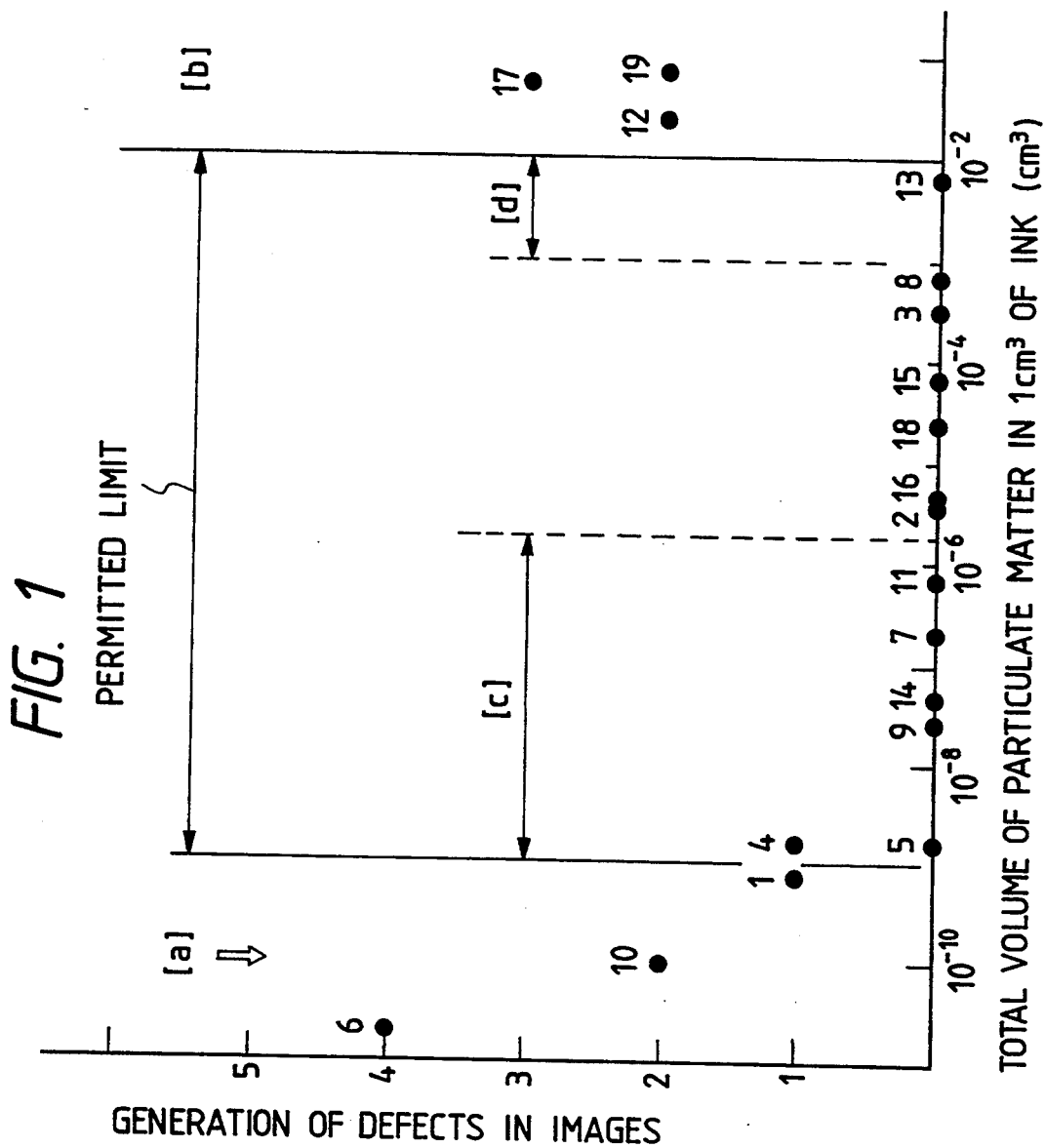
FIG. 1 is a graph showing the relation between the total volume of particulate matter existing in 1 cm$^3$ of ink and the number of generation of defects in image quality.

The present invention will be described in detail below.

The ink-jet recording ink of the invention is known in basic ingredients themselves, and comprises water, a water-soluble organic solvent and a color material as essential ingredients.

Preferred examples of the water-soluble organic solvents include alcohols such as ethanol, isopropanol, butanol, and benzyl alcohol; polyhydric alcohols such as ethylene glycol, diethylene glycol, triethylene glycol, polyethylene glycol, propylene glycol, hexylene glycol, 1,5-pentanediol, glycerin, 1,2,6-hexanetriol, and thiodiethanol; glycol ethers such as ethylene glycol monomethyl ether, ethylene glycol monobutyl ether, diethylene glycol monoethyl ether, diethylene glycol monobutyl ether, propylene glycol monomethyl ether, and propylene glycol monobutyl ether; and other solvents such as pyrrolidone, N-methyl-2-pyrrolidone, cyclohexylpyrrolidone, triethanolamine, dimethyl sulfoxide, and sulfolane.

Of them, polyhydric alcohols (particularly, ethylene glycol, diethylene glycol, propylene glycol and glycerin) and glycol ethers (particularly, diethylene glycol monoalkyl ethers) are preferred. These solvents may be used either individually or in combination of two or more thereof. As the amount of the water-soluble organic solvent increases, the ink has an increased viscosity and reduced output stability. Accordingly, a preferred water-soluble organic solvent content is from about 1 to 60% by weight, more preferably from about 5 to 40% by weight, and most preferably from 5 to 25% by weight, based on the total weight of the ink.

As the color materials constituting the ink of the invention together with water and the water-soluble organic solvents, it is possible to use various types of water-soluble dyes, pigments, disperse dyes containing colored polymer/wax, and oil-soluble dyes. Above all, the water-soluble dyes are preferred because of their better jetting stability. The water-soluble dyes may be any of acid dyes, direct dyes, basic dyes and disperse dyes. Of these, the acid dyes and the direct dyes are more preferred.

Examples thereof include C. I. Direct Black-2, -4, -9, -11, -17, -19, -22, -32, -80, -151, -154, -168, -171, and -194; C. I. Direct Blue-1, -2 , -6, -8, -22, -34, -70, -71, -76, -78, -86, -112, -142, -165, -199, -200, -201, -202, -203, -207, -218, -236, and -287; C. I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, and -189; C. I. Direct Yellow-1, -2, -4, -8, -11, -12, -26, -27, -28, -33, -34, -41, -44, -48, -58, -86, -87, -88, -135, -142, and -144; C. I. Food Black-1 and -2; C. I. Acid Black-1, -2, -7, -16, -24, -26, -28, -31, -48, -52, -63, -107, -112, -118, -119, -121, -156, -172, -194, and -208; C. I. Acid Blue-1, -7, -9, -15, -22, -23, -27, -29, -40, -43, -55, -59, -62, -78, -80, -81, -83, -90, -102, -104, -111, -185, -249 and -254; C. I. Acid Red-1, -4, -8, -13, -14, -15, -18, -21, -26, -35, -37, -110, -144, -180, -249, and -257; C. I. Acid Yellow -1, -3, -4, -7, -11, -12, -13, -14, -18, -19, -23, -25, -34, -38, -41, -42, -44, -53, -55, -61, -71, -76, -78 and -79.

These color materials may be used singly or as a mixture of two or more thereof. Custom colors such as red, blue, and green may also be toned, in addition to four elementary colors of cyan, magenta, yellow and black. The content of color materials ranges from 0.3 to 15% by weight, preferably from 1 to 10% by weight and more preferably from 1 to 8% by weight based on the total weight of ink.

Surfactants, dispersing agents, clathrate compounds and the like may be added, for the purpose of further stabilizing dissolved or dispersed states of color materials. The surfactants may be any of nonionic, anionic, cationic, and amphoteric surfactants.

Examples of the nonionic surfactants include polyoxyethylene octylphenyl ether, polyoxyethylene nonylphenyl ether, polyoxyethylene dodecylphenyl ether, polyoxyethylene alkyl ether, polyoxyethylene/polyoxypropylene block copolymers, polyoxyethylene sorbitan fatty acid esters, polyoxyethylene fatty acid esters, sorbitan fatty acid esters, and fatty acid alkylolamides. Examples of the anionic surfactants include alkylbenzenesulfonates, alkylnaphthalenesulfonates, condensation products of alkylnaphthalenesulfonates with formalin, higher fatty acid salts, sulfuric acid ester salts of higher fatty acid esters, sulfonic acid salts of higher fatty acid esters, sulfuric acid ester salts of higher alcohol ethers, sulfonic acid salts of higher alcohol ethers, alkylcarboxylic acid salts of higher alkylsulfonamides, and sulfosuccinic acid ester salts. The cationic surfactants include primary to tertiary amine salts, and quaternary ammonium salts. The amphoteric surfactants include betaines, sulfobetaines, and sulfate-betaines. Of these, the anionic surfactants can be satisfactorily used.

The surface active agent can be used in an amount of 0.01 to 1 wt %, preferably 0.01 to 0.3 wt % based on the total weight of the ink.

The ink composition of the present invention may further contain water-soluble polymers comprising acrylic acid/methacrylic acid/maleic acid or their salts; solubilizing agent, e.g., urea and acetamide; physical property controlling agents, e.g., polyethyleneimine, polyamines, polyvinylpyrrolidone, polyethylene glycol, and cellulose derivatives; clathrate compounds, e.g., cyclodextrin, macrocyclic amines, and crown ethers; chelating agents, e.g., ethylenediaminetetraacetic acid, cyclohexanediaminetetraacetic acid, diethylenetriamine-pentaacetic acid, ethylenediaminediacetic acid, dioxaoctane-diaminetetraacetic acid, hydroxyethylethylenediaminetriacetic acid, hydroxyethyliminodiacetic acid, nitrilotriacetic acid, triethylenetetraminehexaacetic acid, oxalic acid, malonic acid, condensed polyphosphoric acid, and salts thereof; acids, such as inorganic acids, e.g., hydrochloric acid, sulfuric acid, nitric acid, phosphoric acid, boric acid, chloric acid, and carbonic acid, carboxylic acids, e.g., acetic acid, oxalic acid, maleic acid, benzoic acid, and propionic acid, other organosulfonic acids, and organophosphoric acids; bases, such as amines, e.g., diethanolamine, triethanolamine, and pyridine, alkali metal hydroxides, e.g., sodium hydroxide and potassium hydroxide, sodium carbonate, sodium borate, sodium hydrogencarbonate, sodium acetate, and ammonium hydroxide; and pH adjusting agents, such as buffer solutions, e.g., a Clark-Lubs' buffer solution, a SΦrensen's buffer solution, a Kolfhoff's buffer solution, a Michaelis' buffer solution, a McIlvaine broad buffer solution, a Britton-Robinson's broad buffer solution, a Carmody's broad buffer solution, a Gomori's buffer solution, a Bates-Bower's Tris buffer solution, a HEPES buffer solution, and a Good's buffer solution. If desired, antifungal agents, viscosity adjustors, conducting agents, etc. may be incorporated.

Antifungal agents can be used in an amount of 0.01 to 0.1 wt %, preferably 0.01 to 0.03 wt % based on the total weight of the ink.

Acids, bases and buffer solutions each can be used in a desired amount to control a pH value.

In order to prevent the clogging of a nozzle passage, raw materials from which impurities are removed are generally used for the ink-jet recording ink, and further in manufacturing the ink, they are filtered through filters having an aperture size of several microns or less, usually 0.5 μm or less, to preventing contamination. Accordingly, the ink ought to be free of larger particles than the aperture size of the filter. However, particles having a diameter of 1 μm or larger are actually present, even after filtrated through the filter having an aperture size of 1 μm.

The particles is considered to be formed mainly by reaggregation of ingredients such as dyes or pigments in the ink after filtration. That is, they are soft aggregates, the shape of which changes flexibly, rather than hard particles. Actually, when the ink allowed to pass once through a filter is allowed to pass again through the same filter, the particulate matter remaining on the filter is frequently observed. In particular, when the water-soluble dyes are used as color materials, the particulate matter dissolves again by dropwise addition of water or a vehicle ingredient of the ink. This fact is considered to show that the water-soluble dyes aggregate again in the ink by some action.

In other words, it would be valid to consider that these particles are more of soft agglomerates than hard particles. In fact, when an ink once having been filtered is again subjected to filtration, a residue is often observed on the filter. Observation of the residue under an electron microscope or an optical microscope reveals particulate matter. Further, when observed under an optical microscope, the particles assume the same hue as the dye of the ink, and the particles are re-dissolved on dropping thereon water or a vehicle component of the ink. Considering from these facts, it is believed that the dye and the like in the ink have undergone re-agglomeration in the ink for some unknown reasons. Assuming the main body of the particles as "agglomerate of a dye", it is likely that the amount of the particles is related with solubility of the dye in water or a vehicle, the amount of inorganic impurities of the dye, such as polyvalent metal cations, the amount of water- and vehicle-insoluble organic impurities of the dye, the content of lyophobic colloid, and the like. However, on examination of a number of inks experimentally prepared, universal correlation was not always found between the amount of particles in an ink and (I) the amount of inorganic impurities in a dye, e.g., Si, Ca, Fe, Mg, Cl, $SO_4$, etc., (II) the content of the oil-soluble matter in a dye extracted with toluene, and (III) solubility of a dye in water or a vehicle solvent or the concentration of a dye in an ink. Hence, it would be reasonable to deem that the amount of particles in an ink is a factor dependent of those conventionally indicated, such as the amount of inorganic impurities and the content of lyophobic colloid.

The causes and mechanisms of formation of the particulate matter are not clear. However, the formation thereof is considered to be attributed to a complex effect brought about by complicated entanglement of factors such as the fundamental structures of dyes, the amounts of inorganic and organic impurities in dyes, the interactions of dyes with vehicles, electrolytic additives such as pH adjusters, and surfactants, and the interactions of pigments with dispersing agents, etc. Further, not only the influence of the ink ingredient materials, but also that of the methods for preparing the ink and the conditions thereof has been ascertained.

However, in the ink-jet recording ink containing water, a water-soluble organic solvent and a color material as the essential ingredients, the total volume of the particulate matter existing in 1 $cm^3$ of the ink is adjusted to from $1 \times 10^{-9}$ to $1 \times 10^{-2}$ $cm^3$, whereby defects in images can be prevented to produce highly precise images.

Further, in the ink-jet recording ink containing water, a water-soluble organic solvent and a color material as the essential ingredients, the total volume of the particulate matter existing in 1 $cm^3$ of the ink is adjusted to $3.5 \times 10^{-6}$ or less, whereby ink which is stable even after long-term use can be obtained and change in amount of ink at jetting is slight, as well as defects in images can be prevented. When heat energy is applied to the ink on jetting, the above effects are furthermore improved.

This is considered to be attributed to the particulate matter which inhibits the generation of foams in the ink passages in the ink-jet recording devices, and allows the foams to disappear in a moment even if they are generated, because an increase in the total volume of the particles existing in 1 $cm^3$ of the ink brings about a good result.

However, too many particles cause the clogging at nozzle tips. Besides, in the so-called thermal ink-jet systems in which the ink is jetted by making use of pressure generated by forming and developing foams by heightened heat, too many particles are liable to develop the so-called kogation, the phenomenon that solid ingredients scorch on heaters. The present invention therefore restricts the upper limit of the total volume of the particulate matter existing in 1 $cm^3$ of ink to $1 \times 10^{-2}$ $cm^3$. Further, for preventing the clogging, the diameter of the particulate matter are preferably 20 μm or less, more preferably from 1 to 20 μm and most preferably from 5 to 15 μm. Furthermore, when the above-mentioned total volume ranges from $1 \times 10^{-3}$ to $1 \times 10^{-2}$ cm$^3$, dummy jetting makes it possible to prevent the defects in images.

The ink-jet recording ink of the present invention has a remarkable effect particularly on the ink-jet recording devices having the ink passages formed of two or more kinds of materials. The ink passage formed of a combination of materials largely different in surface energy, for example, such as combinations of metals, glass or ceramics, and plastics or rubbers, or nonpolar polymers and polar polymers, is particularly liable to generate the defects in images which are considered to be attributed to foams when conventional ink is used. Further, the ink jetting nozzle portions formed of two or more kinds of materials are particularly liable to generate the defects in images which are considered to be attributed to foams when conventional ink is used. The structure of the ink passages has a problem, particularly when the inside of the passages have uneven surfaces.

The ink of the present invention does not provide such a defect even when the ink pass through the passages formed of two or more kinds of materials.

The methods for measuring the volume of the particulate matter having a size of 1 μm or larger existing in the ink include light scattering methods, light transmission methods, centrifugal precipitation methods, Coulter counter methods, filter methods, etc. However, the optical methods are difficult to be applied, depending upon colors of ink, and dilution of ink required prior to the measurement makes it difficult to ascertain the actual conditions of ink. The filter methods require a large amount of samples, takes much time to measure, and its precision is insufficient. On the other hand, the Coulter counter methods offer the advantages of requiring no dilution of ink and being independent of colors of ink, although the volume of the particles in the region of submicrons or less can not be measured with sufficient precision.

In view of the above-mentioned circumstances, as the total volume of the particulate matter in the present invention, the volume of the particulate matter having a size of 2 μm or larger existing in ink was determined according to the Coulter counter method (Coulter Model TA manufactured by Coulter Electronics Co., Ltd. in 1983). In determining, although the Coulter counter methods usually require the dilution of sample liquids and the addition of isoton, but the ink is required to be directly measured, because the operation of dilution and the addition of electrolytes have an effect on the conditions of the particulate matter in the ink.

The size of the particulate matter in the ink distributes in the region of from submicrons to several ten micron meters. In order to measure the total volume of the particles existing in 1 cm$^3$ of the ink composition with sufficient precision without clogging of an aperture, the diameter of the aperture should be selected depending upon the particle size. For example, the aperture of 100 μm in diameter only allows to measure the particles of 2 μm or larger in size in principle, but makes it possible to measure the particles without the clogging of the particles. On the other hand, the smaller diameter of the aperture allows to measure the particles in submicrons. For example, the use of the aperture of 30 μm in diameter also makes it possible to measure the particles of 0.6 μm or larger in size. However, the particles of less than 2 μm in size have the smaller volume than the particles of 2 μm or larger, and the behavior thereof corresponds to that of the particles of 2 μm or larger. It is therefore suitable to use the aperture of 100 μm in diameter for measurement.

Accordingly, in the present invention, the total volume of the particles existing in 1 cm$^3$ of ink was determined by using the aperture of 100 μm in diameter and by sucking the ink through the aperture for 3 minutes at room temperature. According to this method, as a result of measurement, the number of the particles divided into 14 ranges from 2.00 to 50.8 μm in particle size is indicated. Assuming that the particles are spheres and regarding the center value of each range as an average diameter, the volume per particle is determined, and multiplied by the number of the particles counted in the corresponding range to find the total volume of each range. The total volume of the particulate matter is obtained by summing the total volume of the respective ranges. Dividing the total volume of the particulate matter thus obtained by the volume of the ink used for measurement leads to the total volume of particulate matter existing in 1 cm$^3$ of the ink.

Alternatively, the volume of each particle is directly read out from the display, and the sum of the results is divided by the volume of the ink composition used for the measurement to give the total volume of the particles present per cm$^3$ of the ink composition. It is recommended to take at least two, and preferably 3 or more measurements for one sample and to obtain an average of the results.

The amount of the particulate matters present in an ink can be controlled by selecting a combination of a color material and a vehicle even from among known materials in such a manner that the color material may have satisfactory solubility in the vehicle and that the dye may be dispersed in the vehicle to satisfactorily form microfine micelles. Further, for the same combination, the amount of the particulate matters can be controlled by adjustment of the concentration of a color material or by addition of additives capable of controlling solubility and dispersibility of a color material in a vehicle, such as a pH adjusting agent, a chelating agent, a surface active agent, a clathrate compound, and a hydrotropy accelerating agent.

In this way, adjustments of the total volume of the particulate matter in ink include but are not particularly limited to the addition of solubilizing agents such as chelating agents, clathrate compounds, surfactants and hydrotropy accelerators, and optimization of the preparation conditions of ink such as the filtration conditions of ink, centrifugation, degassing, mixing, the temperature of dissolution and time, as well as the selection of the kinds of color materials, the adjustment of the color material concentration, the combination of vehicles, and the adjustment of the composition ratio. The present invention needs to adjust the particulate matter in ink to a certain amount, but brings about a sufficient effect according to any method, as long as the total volume exists within the above-mention range.

The ink-jet recording ink of the present invention generates no defects in images which is considered to be attributed to foams even in the ink-jet recording devices of which the ink passages are formed of two or more kinds of materials, when the total volume of the particulate matter existing in 1 cm$^3$ of the ink ranges from $1 \times 10^{-9}$ to $1 \times 10^{-2}$ cm$^3$. The ink which contains a certain amount of the particulate matter within the above-mentioned range develops very locally heterogeneous conditions, which result in lowering the generation of foams and destroying or removing foams staying inside the ink passages, thus preventing defects in image due to the foams and the clogging of the ink passages.

EXAMPLES

The present invention will be illustrated in more detail with reference to the following examples.

EXAMPLE 1

The ingredient materials of ink represented in Tables 1 to 3 were mixed, and then stirred at 60° C. for 3 hours, followed by changes in filter conditions and in the execution or no execution of degassing of the ink. Thus, sample Nos. 1 to 19 of the ink-jet recording ink were prepared.

The compositions of the ink, filtration conditions, the execution or no execution of degassing of ink (60° C., 500 mmHg, 5 hours), the total volume of particulate matter in 1 cm$^3$ of ink are represented in the following Tables 1 to 3, wherein Sample Nos. 1, 6, 10, 12, 17, and 19 are denoted as comparative examples.

TABLE 1

| No. | Composition of Ink (parts by weight) | | Conditions of Filtration ($\mu$m) | Degassing of Ink | Total Volume of Particulate Matter (1.26 $\mu$m or more of diameter in 1 cm$^3$ of Ink (cm$^3$) |
|---|---|---|---|---|---|
| 1. | Food Black #2 | 2 | 0.22 | Not Executed | $9 \times 10^{-10}$ |
| | Diethylene Glycol | 15 | | | |
| | Polyoxyethylene nonylphenyl ether | 0.5 | | | |
| | Pure Water | 80 | | | |
| 2. | Food Black #2 | 4 | 0.45 | Executed | $4 \times 10^{-6}$ |
| | Diethylene Glycol | 10 | | | |
| | Polyoxyethylene lauryl ether | 0.5 | | | |
| | Pure Water | 80 | | | |
| 3. | C.I. Direct Black-168 | 3 | 0.45 | Executed | $5 \times 10^{-4}$ |
| | Glycerin | 10 | | | |
| | Ethylene Oxide/Propylene Oxide Block Copolymer | 0.5 | | | |
| | Pure Water | 75 | | | |
| 4. | C.I. Direct Black-168 | 2 | 0.22 | Not Executed | $2 \times 10^{-9}$ |
| | Glycerin | 10 | | | |
| | Ethylene Oxide/Propylene Oxide Block Copolymer | 1.0 | | | |
| | NaOH | 0.02 | | | |
| | (HOC$_2$H$_4$)$_2$NC$_2$H$_4$SO$_3$H | 0.8 | | | |
| | Pure Water | 80 | | | |
| 5. | C.I. Direct Black-168 | 2 | 0.22 | Executed | $2 \times 10^{-9}$ |
| | Glycerin | 10 | | | |
| | Ethylene Oxide/Propylene Oxide Block Copolymer | 1.0 | | | |
| | NaOH | 0.02 | | | |
| | (HOC$_2$H$_4$)$_2$NC$_2$H$_4$SO$_3$H | 0.8 | | | |
| | Pure Water | 80 | | | |
| 6. | C.I. Acid Blue-9 | 2 | 0.45 | Executed | $3 \times 10^{-11}$ |
| | Diethylene Glycol | 15 | | | |
| | Pure Water | 80 | | | |

TABLE 2

| No. | Composition of Ink (parts by weight) | | Conditions of Filtration ($\mu$m) | Degassing of Ink | Total Volume of Particulate Matter (1.26 $\mu$m or more of diameter in 1 cm$^3$ of Ink (cm$^3$) |
|---|---|---|---|---|---|
| 7. | C.I. Direct Yellow-86 | 2 | 0.45 | Executed | $3 \times 10^{-1}$ |
| | Ethylene Glycol | 16 | | | |
| | NaOH | 0.03 | | | |
| | Polyoxyethylene Lauryl Ether | 0.1 | | | |
| | Pure Water | 85 | | | |
| 8. | C.I. Direct Black-154 | 4 | 0.22 | Not Executed | $8 \times 10^{-4}$ |
| | Propylene Glycol | 20 | | | |
| | Polyoxyethylene Lauryl Ether | 0.1 | | | |
| | Pure Water | 82 | | | |
| 9. | C.I. Acid Red-289 | 4 | 0.45 | Executed | $4 \times 10^{-8}$ |
| | N-Methylpyrrolidone | 10 | | | |
| | Ethylene Glycol | 10 | | | |
| | Pure Water | 75 | | | |
| 10. | Food Black #2 | 2 | 0.22 | Not Executed | $1 \times 10^{-10}$ |
| | Ethylene Glycol | 20 | | | |
| | Polyoxyethylene Nonylphenyl Ether | 0.5 | | | |
| | Urea | 3 | | | |
| | Pure Water | 80 | | | |
| 11. | Food Black #2 | 3 | 0.45 | Executed | $8 \times 10^{-7}$ |
| | Diethylene Glycol | 5 | | | |
| | Polyoxyethylene Lauryl Ether | 0.5 | | | |
| | 2-Pyrrolidone | 5 | | | |
| | Pure Water | 80 | | | |
| 12. | C.I. Direct Black-168 | 3 | | | |
| | Ethylene Glycol | 10 | | | |

TABLE 2-continued

| No. | Composition of Ink (parts by weight) | | Conditions of Filtration ($\mu$m) | Degassing of Ink | Total Volume of Particulate Matter (1.26 $\mu$m or more of diameter in 1 cm$^3$ of Ink (cm$^3$) |
| --- | --- | --- | --- | --- | --- |
| | Ethylene Oxide/Propylene Oxide Block Copolymer | 0.7 | 0.45 | Executed | $3 \times 10^{-2}$ |
| | Pure Water | 75 | | | |

TABLE 3

| No. | Composition of Ink (parts by weight) | | Conditions of Filtration ($\mu$m) | Degassing of Ink | Total Volume of Particulate Matter (1.26 $\mu$m or more of diameter in 1 cm$^3$ of Ink (cm$^3$) |
| --- | --- | --- | --- | --- | --- |
| 13. | C.I. Direct Black-168 | 3 | | | |
| | Ethylene Glycol | 10 | | | |
| | Ethylene Oxide/Propylene Oxide Block Copolymer | 0.7 | 0.45 | Executed | $8 \times 10^{-3}$ |
| | EDTA Na$_2$ | 0.5 | | | |
| | Pure Water | 75 | | | |
| 14. | C.I. Direct Black-168 | 2 | | | |
| | Sulfolane | 10 | 0.22 | Executed | $6 \times 10^{-8}$ |
| | Pure Water | 80 | | | |
| 15. | C.I. Direct Blue-199 | 2 | | | |
| | Diethylene Glycol | 15 | 0.45 | Executed | $8 \times 10^{-5}$ |
| | Pure Water | 80 | | | |
| 16. | C.I. Direct Yellow-86 | 2 | | | |
| | Ethylene Glycol | 16 | | | |
| | NaOH | 0.03 | 0.45 | Executed | $4 \times 10^{-6}$ |
| | Polyoxyethylene Lauryl Ether | 0.1 | | | |
| | Pure Water | 85 | | | |
| 17. | C.I. Direct Black-154 | 5 | | | |
| | Propylene glycol | 20 | 0.22 | Not Executed | $7 \times 10^{-2}$ |
| | Polyoxyethylene Lauryl Ether | 0.1 | | | |
| | Pure Water | 82 | | | |
| 18. | C.I. Acid Red-289 | 4 | | | |
| | N-Methylpyrrolidone | 10 | 0.45 | Not Executed | $4 \times 10^{-5}$ |
| | Ethylene Glycol | 10 | | | |
| | Pure Water | 75 | | | |
| 19. | C.I. Direct Black-154 | 7 | | | |
| | Propylene Glycol | 20 | | | |
| | Ethylene Oxide/Propylene Oxide Block Copolymer | 1.1 | 0.22 | Not Executed | $8 \times 10^{-2}$ |
| | Pure Water | 82 | | | |

Using a thermal ink-jet head (materials forming a passage inside a nozzle; silicone, tantalum, polyimides, etc.), the image qualities of the above-mentioned ink-jet recording ink were evaluated as follows:

A continuous jetting test was conducted with a thermal ink-jet printer (temperature: 22° C., driving frequency: 4.5 kHz). Solid images were continuously printed on 100 sheets of silica-coated paper with a resting period of 10 min per sheet, and the number of generation of blank areas of image, fluctuations in dot diameter, and the disturbed shape of dots was plotted against the total volume of the particulate matter existing in 1 cm$^3$ of ink. The range in which they were not generated was taken as a permitted limit.

This graph is shown in FIG. 1.

In FIG. 1, (a) represents generation of defects in images considered to be attributed to the formation of foams, (b) represents generation of defects in images by clogging, (c) represents generation of defects is inhibitable by degassing, and (d) represents generation of defects is inhibitable by dummy jetting.

The ink-jet recording ink of the present invention can prevent the defects in images such as clears, fluctuations in dot diameter, and the disturbed shape of dots by adjusting the total volume of the particulate matter existing in 1 cm$^3$ of the ink to a range of $1 \times 10^{-9}$ to $1 \times 10^{-2}$ application to ink-jet recording devices of which the ink passages are formed of two or more kinds of materials.

EXAMPLE 2

The components shown in Table 4 below were mixed together and stirred to form a uniform solution, and the resulting solution was passed through a filter having the pore size shown in Table 4 to prepare an ink composition (designated samples 1 to 14). In Table 5 are shown contents of Mg, Si, Ca, Fe, and Zn, typical inorganic substances, present in the dyes used for the preparation of samples. The number of particles present in the ink composition was measured three times per sample by sucking for 3 minutes at room temperature by means of Coulter Counter Model TAII manufactured by Coulter Electronics Co. in 1983 with its aperture diameter being set at 100 $\mu$m to obtain an average total volume of particles per cm$^3$ of the ink composition. The results obtained are shown in Table 5. The parts are by weight.

TABLE 4

| Sample No. | Ink Composition Component | Amount (part) | Filter Pore Size ($\mu$m) | Total Volume of Particles of 1.26 $\mu$m or more per cm$^3$ (cm$^3$) |
|---|---|---|---|---|
| 1 | Food Black 2 | 2 | 0.45 | $2 \times 10^{-6}$ |
|   | diethylene glycol | 15 | | |
|   | pure water | 80 | | |
| 2 | Food Black 2 | 4 | 0.45 | $2 \times 10^{-5}$ |
|   | diethylene glycol | 10 | | |
|   | propylene glycol | 5 | | |
|   | pure water | 80 | | |
| 3 | C.I. Direct Black 168 | 2 | 0.2 | $1.5 \times 10^{-6}$ |
|   | diethylene glycol | 15 | | |
|   | pure water | 80 | | |
| 4 | C.I. Direct Black 168 | 3 | 0.45 | $3 \times 10^{-5}$ |
|   | N-methylpyrrolidone | 5 | | |
|   | glycerin | 10 | | |
|   | pure water | 80 | | |
| 5 | C.I. Direct Black 168 | 4 | 0.2 | $5 \times 10^{-8}$ |
|   | glycerin | 9 | | |
|   | butyl carbitol | 6 | | |
|   | disodium ethylene-diaminetetraacetate | 0.2 | | |
|   | pure water | 80 | | |
| 6 | C.I. Direct Blue 199 | 2 | 0.45 | $1 \times 10^{-7}$ |
|   | glycerin | 10 | | |
|   | butyl carbitol | 5 | | |
|   | CH$_3$COOH | 0.02 | | |
|   | NaOH | 0.02 | | |
|   | Pure water | 80 | | |
| 7 | C.I. Direct Black 168 | 4 | 0.2 | $5 \times 10^{-6}$ |
|   | diethylene glycol | 15 | | |
|   | CH$_3$COOH | 0.01 | | |
|   | pure water | 80 | | |
| 8 | C.I. Direct Blue 199 | 3 | 0.2 | $5 \times 10^{-7}$ |
|   | ethylene glycol | 15 | | |
|   | triethanolamine | 2 | | |
|   | pure water | 80 | | |
| 9 | C.I. Direct Blue 199 | 4 | 0.2 | $1 \times 10^{-5}$ |
|   | diethylene glycol | 15 | | |
|   | pure water | 80 | | |
| 10 | C.I. Direct Yellow 86 | 2 | 0.45 | $1 \times 10^{-8}$ |
|   | N-methylpyrrolidone | 10 | | |
|   | ethylene glycol | 10 | | |
|   | polyoxyethylene lauryl ether | 0.1 | | |
|   | pure water | 80 | | |
| 11 | C.I. Acid Red 289 | 3 | 0.45 | $5 \times 10^{-7}$ |
|   | propylene glycol | 15 | | |
|   | pure water | 80 | | |
| 12 | C.I. Direct Black 168 | 3 | 0.45 | $1 \times 10^{-6}$ |
|   | glycerin | 15 | | |
|   | CH$_3$COOH | 0.02 | | |
|   | NaOH | 0.02 | | |
|   | pure water | 80 | | |
| 13 | C.I. Direct Black 168 | 3 | 0.45 | $2 \times 10^{-7}$ |
|   | diethylene glycol | 15 | | |
|   | ethylene oxide/propylene oxide block copolymer | 1.5 | | |
|   | N-carbamoylmethylimino-dicarboxylic acid | 0.1 | | |
|   | NaOH | 0.2 | | |
|   | pure water | 80 | | |
| 14 | C.I. Direct Blue 199 | 4 | 0.2 | $1.5 \times 10^{-6}$ |
|   | ethylene glycol | 15 | | |
|   | NaOH | 0.04 | | |
|   | pure water | 80 | | |

TABLE 5

| Dye | Typical Inorganic Impurities in Dye (ppm) | | | | |
|---|---|---|---|---|---|
|   | Mg | Si | Ca | Fe | Zn |
| Food Black 2 | 5 | 25 | 20 | 43 | 3 |
| C.I. Direct Black 168 | 9 | 148 | 49 | 102 | 3 |
| C.I. Direct Blue 199 | 2 | 10 | 6 | 11 | 2 |
| C.I. Acid Red 289 | 6 | 5 | 29 | 8 | 7 |
| C.I. Direct Yellow 86 | 23 | 18 | 121 | 5 | 2 |

Figure 2:
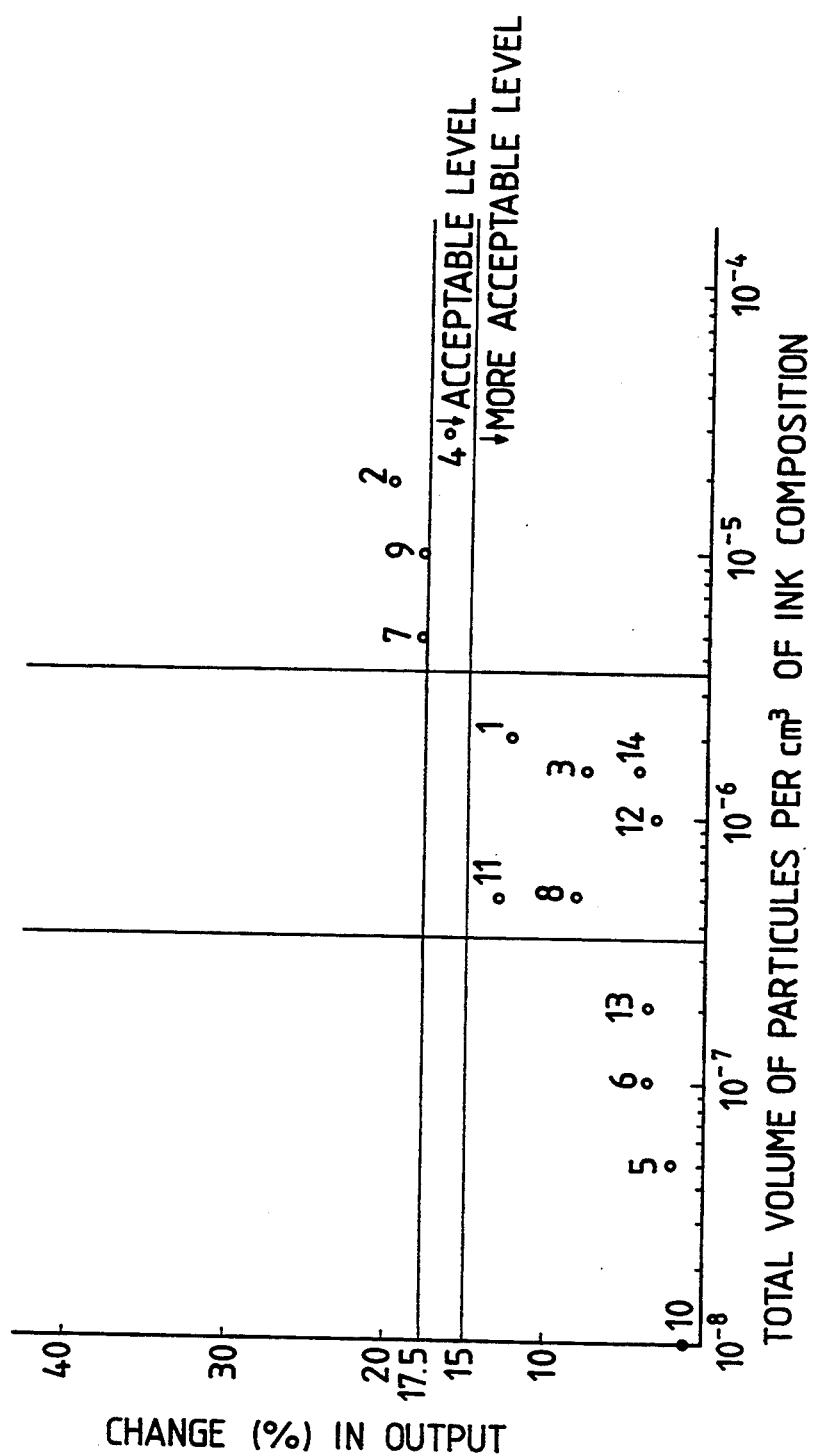
FIG. 2 shows the relationship between change in ink output (%) at the $2 \times 10^7$th jet and total volume (cm$^3$) of particles per cm$^3$ of an ink composition.

The sample ink composition was loaded into a thermal ink jet printer which was manufactured experimentally by using the thermal ink jet head described in JP-A-1-148560 (the term "JP-A" as used herein means an "unexamined published Japanese patent application"). The ink was continuously spouted under conditions of a temperature of 22° C. and a driving frequency of 4.5 kHz, and the ink output was measured as follows. The ink was spouted to make 10$^4$ dots and the consumption of the ink for this jet was measured on every $2 \times 10^6$ jets until $2 \times 10^7$ jets were made and on every $1 \times 10^7$ jets after that till $2 \times 10^8$ jets. The ink consumption was divided by $10^4$ to obtain an ink output per dot. A percentage of the difference between the output per dot at the first jet and that measured at a prescribed interval to the output per dot at the first jet was taken as a rate of change in output. FIG. 2 is a graph depicting the relationship between a rate of change in output at the $2 \times 10^7$th jet and the total volume of particles per cm$^3$ of the ink. FIG. 3 is a graph showing the relationship between a rate of change in output at the $2 \times 10^8$th jet and the total volume of particles per cm$^3$ of the ink. In the FIGS., the numerals attached to plots each represent the sample No.

As shown in FIGS. 2 and 3, samples whose total volume of particles per cm$^3$ of the ink composition is not more than $3.5 \times 10^{-6}$ cm$^3$ show a rate of change of 15% or less at the $2 \times 10^7$th jet, and samples whose total volume of particles per cm$^3$ of the ink composition is not more than $3.5 \times 10^{-7}$ cm$^3$ show a rate of change of 15% or less at the $2 \times 10^8$th jet.

These results reveal that an ink composition for ink jet recording comprising water, a water-soluble organic solvent, and a water-soluble dye which is characterized in that the particles present per cm$^3$ of the ink composition have a total volume of not more than $3.5 \times 10^{-6}$ cm$^3$, and preferably not more than $3.5 \times 10^{-7}$ cm$^3$, exhibits satisfactory liquid stability and, when applied to an ink jet recording system using heat energy for ink spouting for a prolonged period of time, undergoes little change in ink output.

JP-B-3-48953 reports that a recording ink for ink jet recording excellent in liquid stability is provided by adjusting the total content of calcium, magnesium, manganese, iron, aluminum, and silicon to 20 ppm or less. To the contrary, the ink composition according to the present invention prove to have satisfactory liquid stability although the total content of calcium, magnesium, iron, and silicon exceeds 20 ppm.

The ink for ink jet recording according to the present invention in which the total volume of the particulate matter existing in 1 cm$^3$ of the ink ranges $3.5 \times 10^{-6}$ cm$^3$ or less exhibits satisfactory liquid stability and undergoes less change in ink output even in long-term use and is therefore useful.

While the invention has been described in detail and with reference to specific embodiments thereof, it will be apparent to one skilled in the art that various changes and modifications can be made therein without departing from the spirit and scope thereof.

What is claimed is:

1. An ink-jet recording ink comprising water, a water-soluble organic solvent and a color material, wherein the total volume of particulate matter existing in 1 cm$^3$ of the ink ranges from $1 \times 10^{-9}$ to $1 \times 10^{-2}$ cm$^3$.

2. The ink-jet recording ink as claimed in claim 1 in which the total volume of the particulate matter existing in 1 cm$^3$ of the ink ranges from $1 \times 10^{-9}$ to $3.5 \times 10^{-6}$ cm$^3$.

3. The ink-jet recording ink as claimed in claim 1, wherein the particulate matter has 20 μm or less of average diameter.

4. An ink-jet recording method comprising jetting an ink through at least one passage while applying heat energy to said ink, wherein said ink comprises water, a water-soluble organic solvent and a color material, and the total volume of particulate matter existing in 1 cm$^3$ of said ink ranges from $1 \times 10^{-9}$ to $1 \times 10^{-2}$ cm$^3$.

5. An ink-jet recording method according to claim 4, wherein said at least one passage is formed of two or more kinds of materials.

6. An ink-jet recording method according to claim 5, wherein said two or more kinds of materials are selected from the group consisting of metals, glasses, ceramics, plastics, and rubbers.

7. An ink-jet recording method according to claim 4, wherein said method prevents defects in images formed by said jetting.

8. An ink-jet recording method according to claim 4, wherein ink droplets jetted by said method maintain a constant size over time.

9. An ink-jet recording ink according to claim 3, wherein the particulate matter has an average diameter of 1 to 20 μm.

10. An ink-jet recording ink according to claim 9, wherein the particulate matter has an average diameter of 5 to 15 μm.

11. An ink-jet recording ink comprising water, about 1 to about 60% by weight, based on the weight of the ink, of a water-soluble organic solvent selected from the group consisting of polyhydric alcohols, glycol ethers, pyrrolidones, triethanolamine, dimethyl sulfoxide and sulfolane, and about 0.3 to about 15% by weight, based on the weight of the ink, of a color material selected from the group consisting of water-soluble dyes, pigments and disperse dyes containing colored polymer or wax, wherein the total volume of particulate matter existing in 1 cm$^3$ of the ink ranges from $1 \times 10^{-9}$ to $1 \times 10^{-2}$ cm$^3$.

12. The ink-jet recording ink according to claim 11, wherein the total volume of particulate matter existing in 1 cm$^3$ of the ink ranges from $1 \times 10^{-9}$ to $3.5 \times 10^{-6}$ cm$^3$.

* * * * *